(12) United States Patent
Sung et al.

(10) Patent No.: US 10,086,435 B2
(45) Date of Patent: Oct. 2, 2018

(54) CUTTING INSERT FOR HIGH-EFFICIENT CUTTING

(75) Inventors: Wook Jung Sung, Chungcheongbuk-do (KR); In Sik Sung, Seoul (KR)

(73) Assignee: Korloy Inc., Seoul (KR)

( * ) Notice: Subject to any disclaimer, the term of this patent is extended or adjusted under 35 U.S.C. 154(b) by 1362 days.

(21) Appl. No.: 12/444,368

(22) PCT Filed: Dec. 17, 2007

(86) PCT No.: PCT/KR2007/006567
§ 371 (c)(1),
(2), (4) Date: Apr. 3, 2009

(87) PCT Pub. No.: WO2008/078892
PCT Pub. Date: Jul. 3, 2008

(65) Prior Publication Data
US 2010/0034602 A1   Feb. 11, 2010

(30) Foreign Application Priority Data

Dec. 27, 2006   (KR) .......................... 10-2006-0135150

(51) Int. Cl.
*B23B 27/14* (2006.01)
*B23C 5/06* (2006.01)
*B23C 5/20* (2006.01)

(52) U.S. Cl.
CPC .............. *B23B 27/141* (2013.01); *B23C 5/06* (2013.01); *B23C 5/202* (2013.01);
(Continued)

(58) Field of Classification Search
CPC ...... B23B 2200/049; B23B 2200/0495; B23B 2200/087; B23B 27/141; B23B 27/145;
(Continued)

(56) References Cited

U.S. PATENT DOCUMENTS 4,288,179 A * 9/1981 Kruger et al. ................ 407/114
5,890,853 A * 4/1999 Hiranaka ...................... 408/224
(Continued)

FOREIGN PATENT DOCUMENTS

| CN | 1124474 | 6/1996 |
|---|---|---|
| JP | 02-053502 | 2/1990 |

(Continued)

*Primary Examiner* — Jennifer Swinney
(74) *Attorney, Agent, or Firm* — Boyle Frederickson S.C.

(57) ABSTRACT

A cutting insert for high-efficiency cutting is disclosed. The cutting insert includes an upper surface (110a), a lower surface (HOb), side surfaces (114) and corner side surfaces (116), which connect the side surfaces to each other. A circular opening is formed through the central portions of the upper and lower surfaces. In the cutting insert, cutting edges are formed by respective junctions between one of the upper and lower surfaces and the side surfaces and between one of the upper and lower surfaces and the corner side surfaces. The cutting edges comprise three corner cutting edges (122), six major cutting edges (124), which extend from opposite ends of the corner cutting edges towards the neighbor corner cutting edges, and three minor cutting edges (126), which are connected between the major cutting edges. Furthermore, the cutting edges may be formed on both the upper surface and the lower surface.

18 Claims, 6 Drawing Sheets

(52) U.S. Cl.
CPC . *B23B 2200/0495* (2013.01); *B23B 2200/087* (2013.01); *B23B 2200/286* (2013.01); *Y10T 407/23* (2015.01)

(58) Field of Classification Search
CPC ........... B23C 5/06; B23C 5/202; B23C 5/207; Y10T 407/23
USPC ............................ 407/2, 113, 114, 115, 116
See application file for complete search history.

(56) References Cited

U.S. PATENT DOCUMENTS

| | | | | |
|---|---|---|---|---|
| 6,079,912 | A * | 6/2000 | Rothballer | 407/114 |
| 6,543,970 | B1 * | 4/2003 | Qvarth et al. | 407/114 |
| 6,709,205 | B2 * | 3/2004 | Morgulis et al. | 407/113 |
| 6,935,815 | B2 * | 8/2005 | Schwaner et al. | 407/114 |
| 7,237,985 | B2 * | 7/2007 | Leuze et al. | 408/227 |
| 7,452,167 | B2 * | 11/2008 | Nishio et al. | 407/113 |
| 7,549,825 | B2 * | 6/2009 | Wermeister | 407/113 |
| 2004/0146365 | A1 * | 7/2004 | Usui et al. | 407/113 |

FOREIGN PATENT DOCUMENTS

| | | | | |
|---|---|---|---|---|
| JP | 02053502 A * | 2/1990 | | B23B 27/14 |
| JP | 2006-082180 | 3/2006 | | |
| KR | 10-2005-0013631 | 2/2005 | | |
| KR | 10-2006-0102398 | 9/2006 | | |

* cited by examiner

CUTTING INSERT FOR HIGH-EFFICIENT CUTTING

BACKGROUND OF THE INVENTION

1. Field of the Invention

The present invention relates, in general, to cutting inserts for high-efficiency cutting and, more particularly, to a cutting insert for high-efficiency cutting which has increased stiffness and thus makes it possible to stably conduct a cutting process despite the realization of rapid feed cutting, in which the number of cutting edges is increased, thus extending the lifetime of the cutting insert, and which can be applied to a milling operation and a turning operation, thus realizing a multi-functional structure and being economical, and can increase productivity when cutting and realize high-quality cutting.

2. Description of the Related Arts

Generally, cutting tools are used to cut iron, nonferrous workpieces, and nonmetallic workpieces. Typically, cutting tools are held by machines and cut workpieces to form them into desired shapes. Such a cutting tool includes a cutting insert, which has a cutting edge, and a cutter body, which supports the cutting insert.

Furthermore, according to a method of fixing a cutting insert to a cutter body, the cutting tools are classified into a brazing type cutting tool and an indexable type cutting tool. In the brazing type cutting tool, a cutting insert is permanently fixed to part of a cutter body by brazing. In the indexable type cutting tool, a cutting insert is removably fastened to a cutter body using a locking means, which is provided in the cutter body.

In the case of the indexable type cutting tool, because the cutting insert can be easily replaced with a new one when the lifetime of the cutting edge thereof expires, it can overcome the problem with the brazing type cutting tool, that is, the problem in which an expert must spend a long time grinding the cutting edge of the cutting insert after the lifetime of the cutting edge has been spent. Therefore, at present, indexable type cutting tools are widely used in the field of cutting tools.

Meanwhile, as methods of cutting a metallic workpiece using the cutting tool, there are two representative methods. First, there is a cutting method in which a workpiece, which is rotated, is brought into contact with the cutting edge of a cutting tool, which is stationary. Second, there is a cutting method, in which a tool having a cutting edge, that is, a cutting insert, is fixed to a machine using a tool holder, and, in this state, the cutting insert is rotated and is brought into contact with a workpiece, which is stationary, thus forming the workpiece into a desired shape. Turning is a representative example of the first cutting method, and milling is a representative example of the second cutting method.

Recently, in the cutting tool market, as part of the trend of pursuing high economic efficiency, high production efficiency and multi-functionality, various products to be used in turning machines and milling machines have been developed to improve economic efficiency and cutting quality and to realize high productivity by rapid feed cutting.

However, in the case of a conventional single-sided cutting insert, which is typically used in milling, the number of cutting edges to be used is limited due to the single-sided structure. Furthermore, the conventional single-sided cutting insert is disadvantageous in that, because a clearance angle is defined in the side surface thereof, the strength of the cutting insert is reduced, with the result that the cutting insert may be damaged by high-speed and rapid feed cutting.

SUMMARY OF THE INVENTION

Accordingly, the present invention has been made keeping in mind the above problems occurring in the prior art, and an object of the present invention is to provide a cutting insert for high-efficiency cutting which has increased stiffness and thus makes it possible to stably conduct a cutting process despite the realization of rapid feed cutting, in which the number of cutting edges is increased, thus extending the lifetime of the cutting insert, and which can be applied to a milling operation and a turning operation, thus realizing a multi-functional structure and being economical, and can increase productivity when cutting and realize high-quality cutting.

In order to accomplish the above object, the present invention provides a cutting insert for high-efficiency cutting, including an upper surface, a lower surface, side surfaces for connecting the upper surface and the lower surface to each other, and corner side surfaces for connecting the side surfaces to each other in rounded shapes, with a circular opening formed through central portions of the upper and lower surfaces, the cutting insert comprising: cutting edges formed by respective junctions between one of the upper and lower surfaces and the side surfaces and between one of the upper and lower surfaces and the corner side surfaces, the cutting edges comprising: three corner cutting edges, six major cutting edges extending from opposite ends of the corner cutting edges towards neighboring corner cutting edges, and three minor cutting edges connected between the major cutting edges.

Alternatively, the cutting edges may be formed by respective junctions between the upper and lower surfaces and the side surfaces and between the upper and lower surfaces and the corner side surfaces, and the cutting edges may comprise six corner cutting edges, twelve major cutting edges extending from opposite ends of the corner cutting edges towards the neighboring corner cutting edges, and six minor cutting edges connected between the major cutting edges.

In the cutting insert of the present invention, the cutting edges, which comprise the corner cutting edges, the major cutting edges and the minor cutting edges, may further comprise a boundary cutting edge provided between each of the opposite ends of each of the minor cutting edges and the corresponding neighboring major cutting edge, the boundary cutting edge having a predetermined curvature. The boundary cutting edge may have a curvature radius ranging from 0.3 mm to 3.0 mm. Each of the corner cutting edges may have a curvature radius ranging from 0.5 mm to 3.0 mm.

In addition, in the cutting insert of the present invention, a corner land surface, a major cutting edge land surface and a minor cutting edge land surface may respectively extend from each of the corner cutting edges, each of the major cutting edges and each of the minor cutting edges towards the upper surface or the lower surface at predetermined inclined angles. A corner chip breaker, a major cutting edge chip breaker and a minor cutting edge chip breaker may be respectively provided between the upper surface or the lower surface and the corner land surface, the major cutting edge land surface and the minor cutting edge land surface. Each of the corner chip breaker, the major cutting edge chip breaker and the minor cutting edge chip breaker may have a chip breaker angle $\theta$ that is less than 90° with respect to the corresponding corner side surface or the corresponding side surface.

The major cutting edges may extend from respective opposite ends of each of the corner cutting edges towards the corresponding neighbor corner cutting edges at an included angle ($\alpha$) ranging from 80° to 120°.

Furthermore, an angle ($\beta$) between each of the minor cutting edges and the adjacent major cutting edge may be less than 30°. The minor cutting edges may be arranged to have a 120° rotationally symmetrical structure based on the circular opening.

The corner cutting edges, the major cutting edges, the boundary cutting edges and the minor cutting edges may be flush with each other. When seen in a plan view or a front view of the cutting insert, the boundary cutting edges and the corresponding minor cutting edge may have a predetermined convex curvature. Here, a radius of the convex curvature may range from 150 mm to 300 mm.

In addition, the minor cutting edges may be formed higher or lower than the corner cutting edges, and each of the major cutting edges may extend from the corresponding corner cutting edge towards the corresponding minor cutting edge at an upward or downward incline.

When the corner cutting edges and the minor cutting edges are seen in a front view, each of the major cutting edges, which is formed in the upper surface, and the corresponding major cutting edge, which is formed in the lower surface, may be oriented relative to each other at an angle ($\gamma$) ranging from 0° to 20°.

When the corner cutting edges and the minor cutting edges are seen in a front view, the adjacent major cutting edges, which extend from respective opposite ends of each of the corner cutting edges or each of the minor cutting edges, may have an included angle $\delta$ ranging from 160° to 180°.

When seen in a plan view of the cutting insert, each of the major cutting edges and the minor cutting edges may be defined by a linear line. When seen in a plan view or a front view of the cutting insert, each of the minor cutting edges may be defined by a convex curved line.

The above and other objects, features and advantages of the present invention will be more clearly understood from the following detailed description taken in conjunction with the accompanying drawings. The terms and words used in the specification and claims must be regarded as having concepts selected by the inventor as the best method of illustrating the present invention, and must be interpreted as having meanings and concepts adapted to the scope and spirit of the present invention to understand the technology of the present invention.

A cutting insert for high-efficiency cutting according to the present invention includes corner cutting edges, major cutting edges, minor cutting edges and boundary cutting edges to have a structure such that the effective cutting width is increased and the force required for cutting is reduced, thus realizing rapid feed cutting, thereby increasing the material removal rate.

Furthermore, in the present invention, the cutting edges are formed on the upper and lower surfaces of the cutting insert. Therefore, compared to the single-sided cutting insert, the number of cutting edges is increased, so that the lifetime and the economic efficiency of the cutting insert are increased. In addition, the cutting insert of the present invention realizes rapid feed cutting, thus reducing the cutting time, and increasing a material removal rate, thereby realizing high efficiency, high productivity and high economic efficiency when milling and turning.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION OF THE PREFERRED EMBODIMENT

Figure 1:
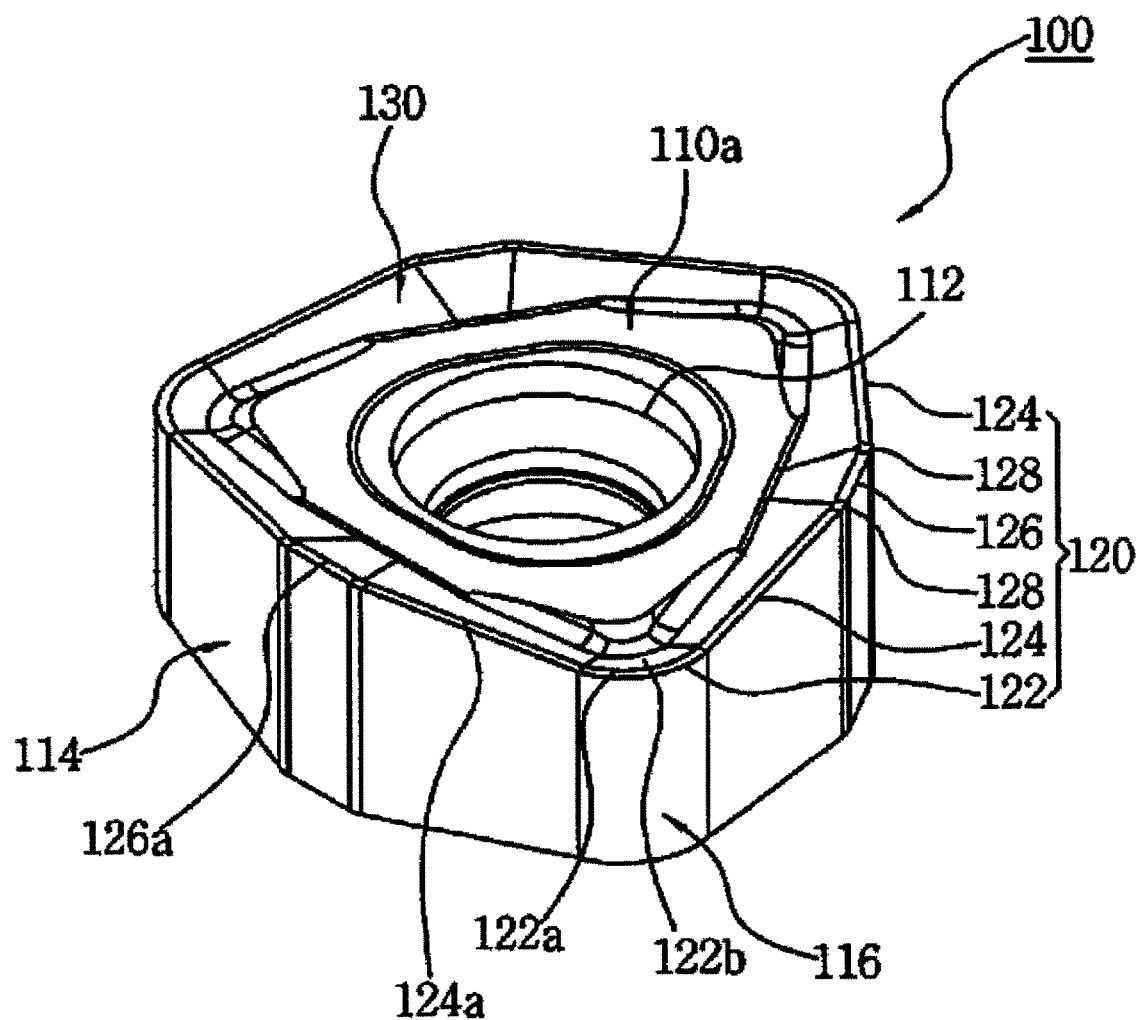
FIG. 1 is a perspective view of a cutting insert for high-efficiency cutting, according to the present invention.

The above and other objects, features and advantages of the present invention will be more clearly understood from the following detailed description.

Hereinafter, a preferred embodiment of the present invention will be described with reference to the attached drawings.

Reference now should be made to the drawings, in which the same reference numerals are used throughout the different drawings to designate the same or similar components. Furthermore, in the description of the present invention, a detailed explanation of well-known techniques and constructions will be omitted in order to more clearly describe the gist of the present invention.

Figure 2:
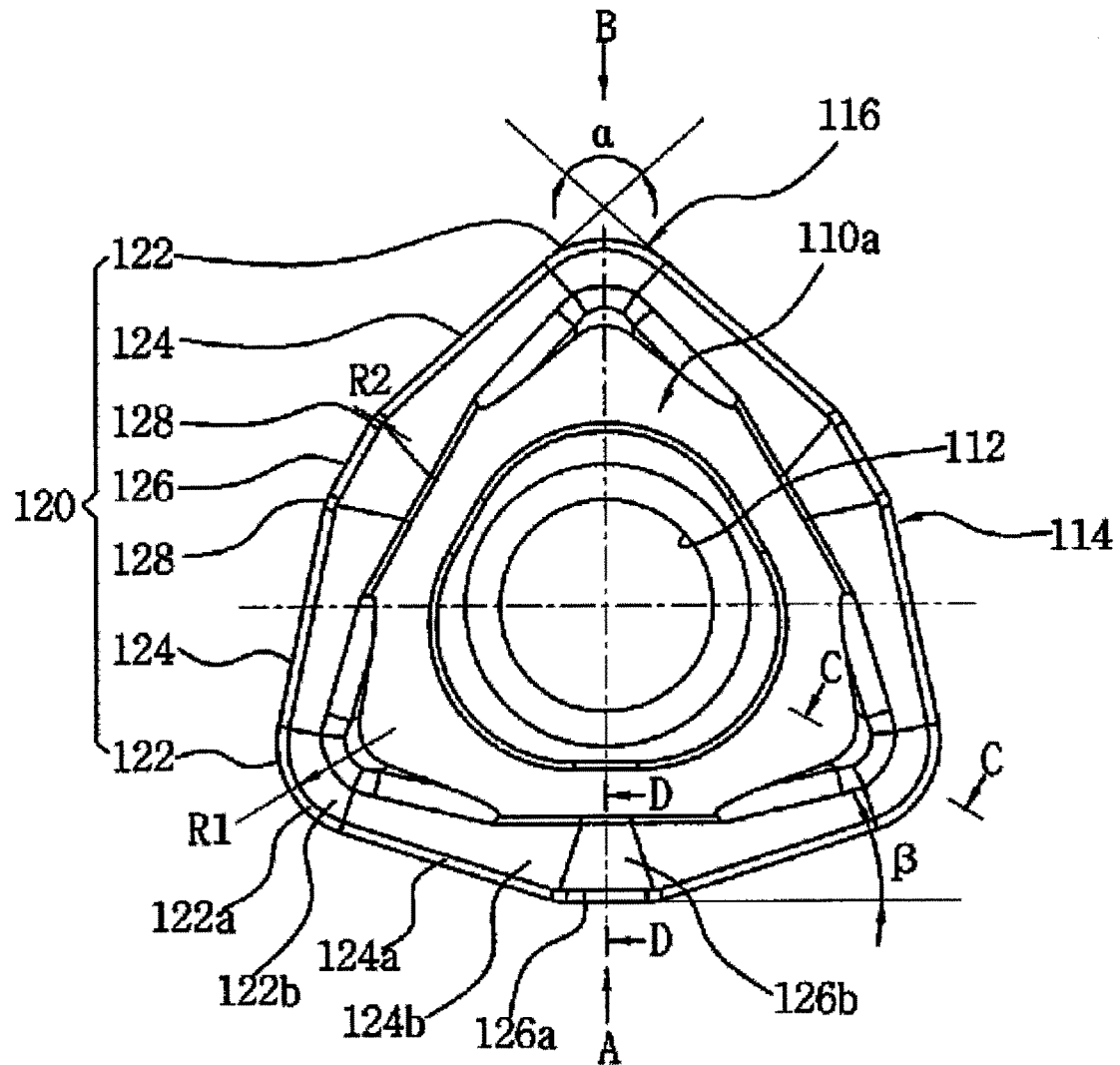
FIG. 2 is a plan view of the cutting insert of FIG. 1.
Figure 3:
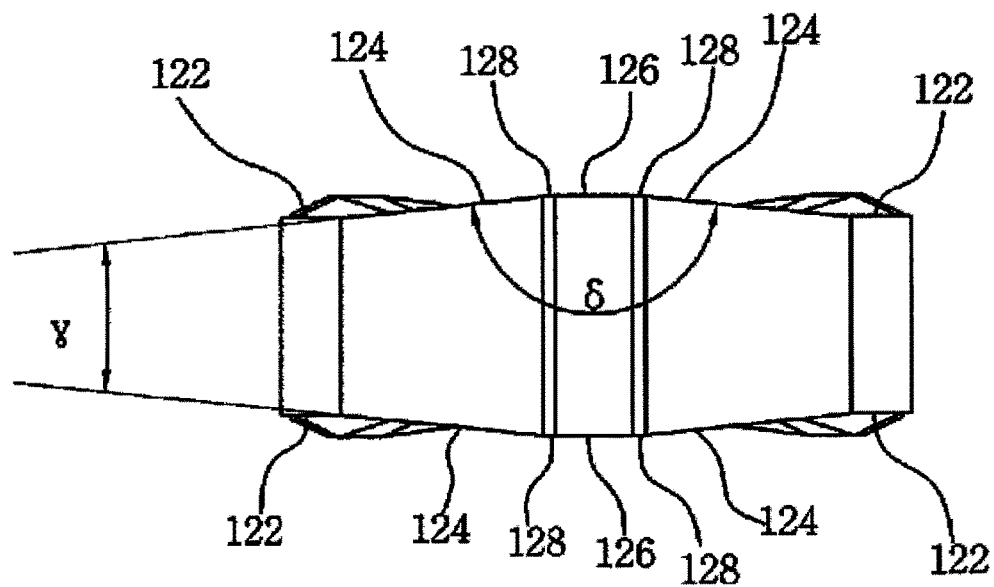
FIG. 3 is a view showing the cutting insert from the direction indicated by the character "A" of FIG. 2.
Figure 4:
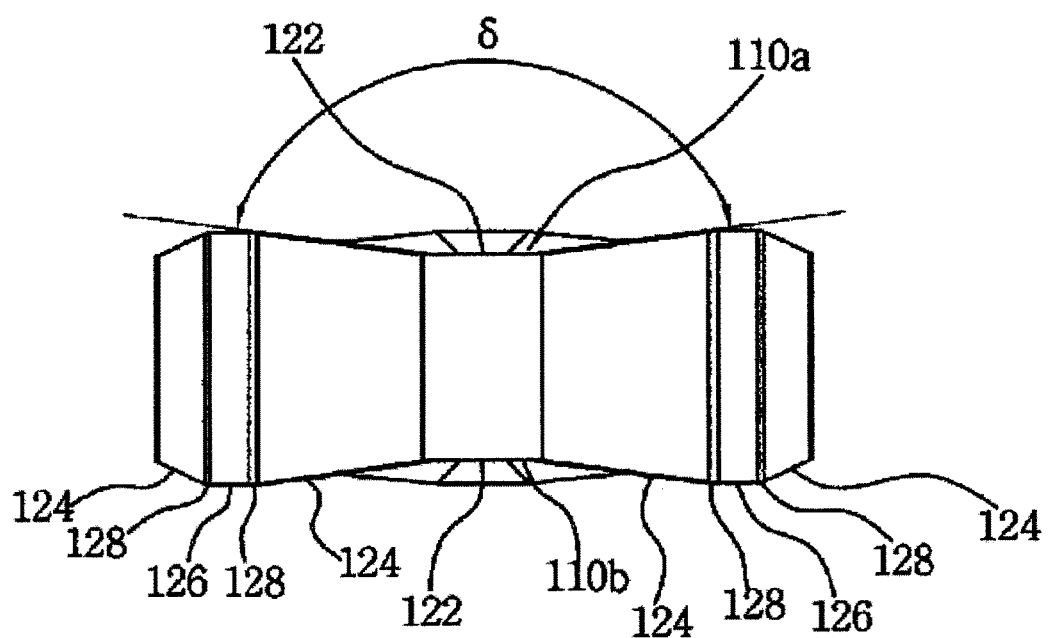
FIG. 4 is a view showing the cutting insert from the direction indicated by the character "B" of FIG. 2.
Figure 5:
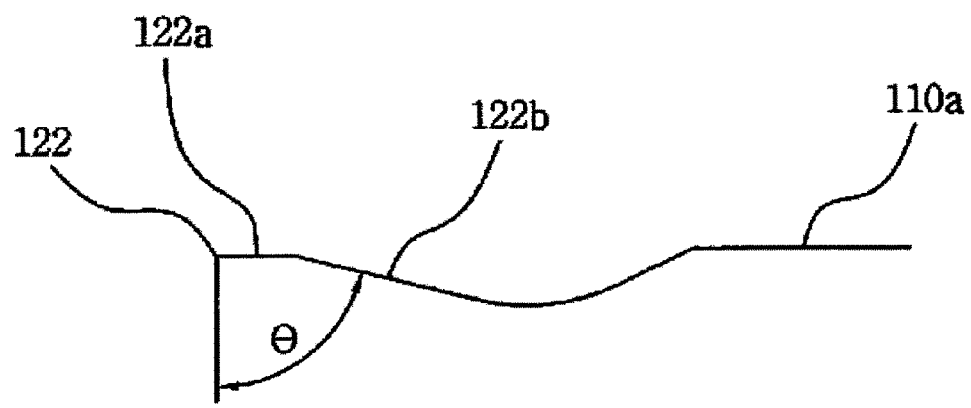
FIG. 5 is a sectional view taken along the line C-C of FIG. 2.
Figure 6:
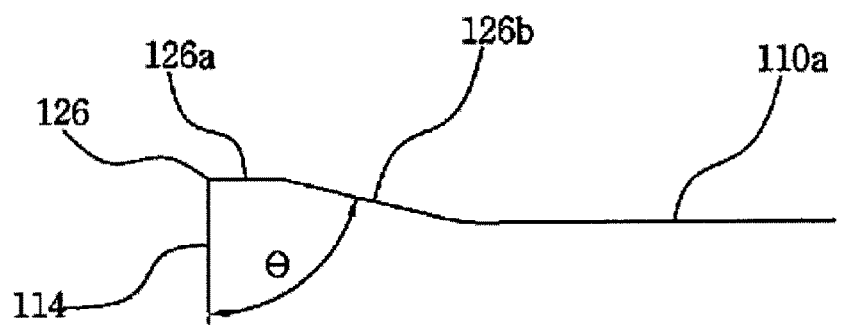
FIG. 6 is a sectional view taken along the line D-D of FIG. 2.

FIG. 1 is a perspective view of a cutting insert for high-efficiency cutting, according to the present invention. FIG. 2 is a plan view of the cutting insert of FIG. 1. FIG. 3 is a view showing the cutting insert from the direction indicated by the character "A" of FIG. 2. FIG. 4 is a view showing the cutting insert from the direction indicated by the character "B" of FIG. 2. FIG. 5 is a sectional view taken along the line C-C of FIG. 2. FIG. 6 is a sectional view taken along the line D-D of FIG. 2.

Referring to FIGS. 1 and 2, the cutting insert 100 of the present invention is made of cemented carbide through powder metallurgy, including a die stamping process, a sintering process, a PIM power injection molding process, a grinding process, etc.

The cutting insert 100 has an upper surface 110a and a lower surface 110b. A circular opening 112 is formed through the central portions of the upper surface 110a and the lower surface 110b. Furthermore, the cutting insert 100 has side surfaces 114, which connect the upper surface 110a and the lower surface 110b to each other, and a corner side surface 116, which connects the adjacent side surfaces 114 to each other to form a rounded shape. The cutting inset insert 100 further has cutting edges 120, which are provided in respective junctions between the upper and lower surfaces 110a and 110b and the side surfaces 114 and between the upper and lower surfaces 110a and 110b and the corner side surfaces 116, and a chip breaker 130, which extends from each cutting edge 120 towards the upper surface 110a and the lower surface 110b. In the cutting insert 100 having the above-mentioned structure, the upper surface 110a or the lower surface 110b is selectively used when cutting iron or a nonferrous metallic substance. The upper surface 110a and the lower surface 110b have a symmetrical structure based on an imaginary center line, which sections the side surfaces 114 into two parts, that is, upper and lower parts. Each of the upper surface 110a and the lower surface 110b has a 120° rotationally symmetrical structure based on the circular opening 112. In other words, each of the upper surface 110a and the lower surface 110b has an approximately triangular shape.

Referring to FIGS. 1 through 6, the cutting edges 120 include corner cutting edges 122, which are respectively provided on three corners of each of the upper surface 110a and the lower surface 110b, and major cutting edges 124 and a minor cutting edge 126, which are provided between the adjacent corner cutting edges 122. The cutting edges 120, which include the corner cutting edges 122, the major cutting edges 124 and the minor cutting edges 126, may be provided on only one of the upper surface 110a and the lower surface 110b.

Each corner cutting edge 122 has a curvature radius R1 ranging from 0.5 mm to 3.0 mm and is formed by a junction between the upper surface 110a or the lower surface 110b and the corresponding corner side surface 116. In the same manner, each of the major cutting edges 124 and the minor cutting edges 126 is formed by the junction between the upper surface 110a or the lower surface 110b and the corresponding side surface 114. Furthermore, a corner land surface 122a, a major cutting edge land surface 124a and a minor cutting edge land surface 126a, which extend towards the upper surface 110a or the lower surface 110b at predetermined inclined angles, are respectively provided on the corner cutting edge 122, the major cutting edge 124 and the minor cutting edge 126. In addition, a corner chip breaker 122b, a major cutting edge chip breaker 124b and a minor cutting edge chip breaker 126b are respectively provided between the corner land surface 122a, the major cutting edge land surface 124a and the minor cutting edge land surface 126a and the upper surface 110a or the lower surface 110b. Each of the corner chip breakers 122b, the major cutting edge chip breakers 124b and the minor cutting edge chip breakers 126b has a chip breaker angle θ that is less than 90°, and preferably ranges from 65° to 89°, with respect to the corresponding corner side surface 116 or the corresponding side surface 114 (refer to FIGS. 5 and 6).

Two major cutting edges 124 extend from the respective opposite ends of each corner cutting edge 122 towards the corresponding neighboring corner cutting edges 122 at an included angle α ranging from 80° to 120°, preferably, at an included angle α ranging from 90° to 110°. Each minor cutting edge 126 connects the major cutting edges 124, which extend from the corresponding adjacent corner cutting edges 122 towards the minor cutting edge 126, to each other. That is, the minor cutting edge 126 is provided between the corresponding major cutting edges 124. Here, the angle β between each minor cutting edge 126 and the corresponding adjacent major cutting edge 124 is less than 30°, and preferably ranges from 10° to 25°. The minor cutting edges 126 are arranged such that they form a 120° rotationally symmetrical structure based on the circular opening 112.

Meanwhile, the cutting edges 120 further include a boundary cutting edge 128, which is provided between each of the opposite ends of each minor cutting edge 126 and the corresponding neighbor major cutting edge 124 and has a predetermined curvature R2. Each boundary cutting edge 128 has a curvature radius ranging from 0.3 mm to 3.0 mm.

The corner cutting edges 122, the major cutting edges 124, the boundary cutting edges 128 and the minor cutting edges 126, which have the above-mentioned shapes, may be flush with each other.

Alternatively, the minor cutting edges 126 are formed higher or lower than the corner cutting edges 122. In this case, each major cutting edge 124 extends from the corresponding corner cutting edge 122 towards the corresponding minor cutting edge 126 at an upward or downward incline. Furthermore, the major cutting edges 124 and the minor cutting edges 126 are linear when seen in the plan view of the cutting insert 100. Each major cutting edge 124, which is formed in the upper surface 110a, and the corresponding major cutting edge 124, which is formed in the lower surface 110a, are oriented relative to each other at an angle γ ranging from 0° to 20°, preferably, at an angle γ ranging from 4° to 15°, when the corner cutting edges 122 and the minor cutting edges 126 are seen in the front view. In the same manner, when the corner cutting edges 122 and the minor cutting edges 126 are seen in the front view, the adjacent major cutting edges 124, which extend from the opposite ends of each corner cutting edge 122 or each minor cutting edge 126, have an included angle δ ranging from 160° to 180°, preferably an included angle δ ranging from 165° to 176°.

Preferably, when seen in the plan view or the front view of the cutting insert 100, each of the major cutting edges 124, the boundary cutting edges 128 and the minor cutting edge 126 may have a predetermined convex curvature, and, in this case, they have a curvature radius ranging from 150 mm to 300 mm, preferably, a curvature radius ranging from 150 mm to 250 mm.

More preferably, when seen in the plan view or the front view of the cutting insert 100, each minor cutting edge 126 is defined by a convex curved line.

Below, the mounting of the cutting insert 100 having the above-mentioned structure to a milling cutter body M or a turning cutter body L will be explained.

Figure 7:
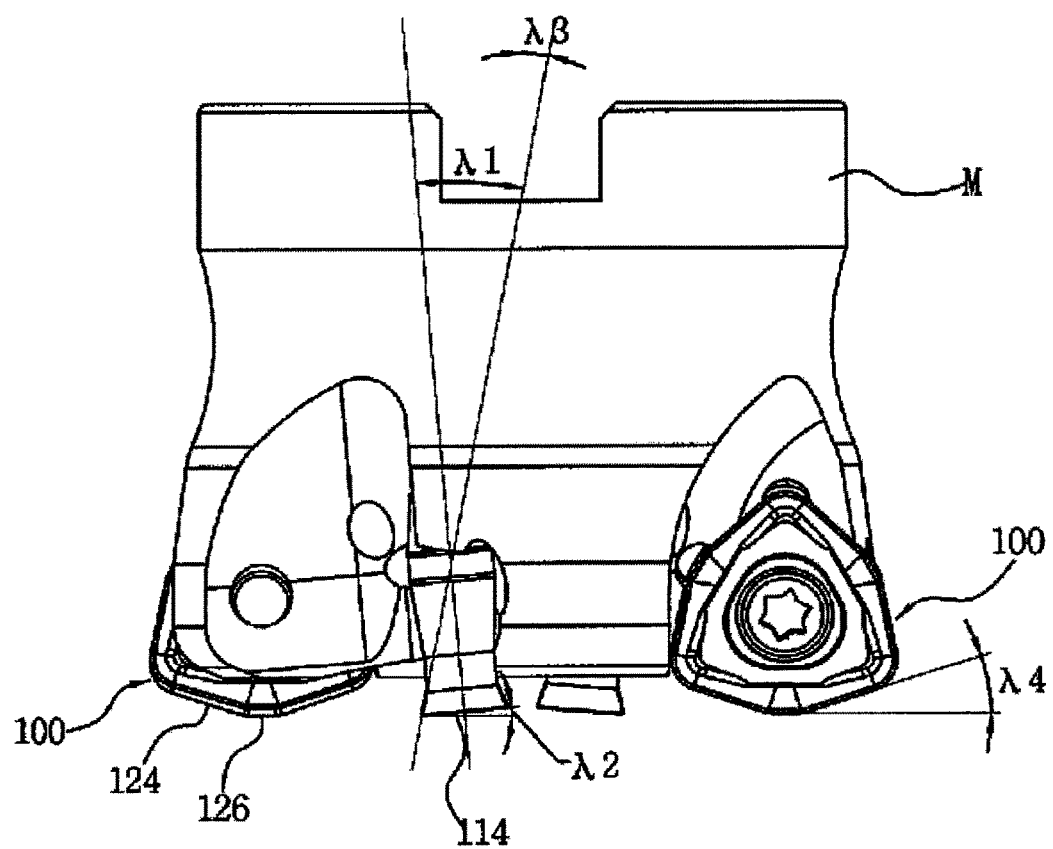
FIG. 7 is a view showing the mounting of the cutting insert of FIG. 1 to a milling cutter body.
Figure 8:
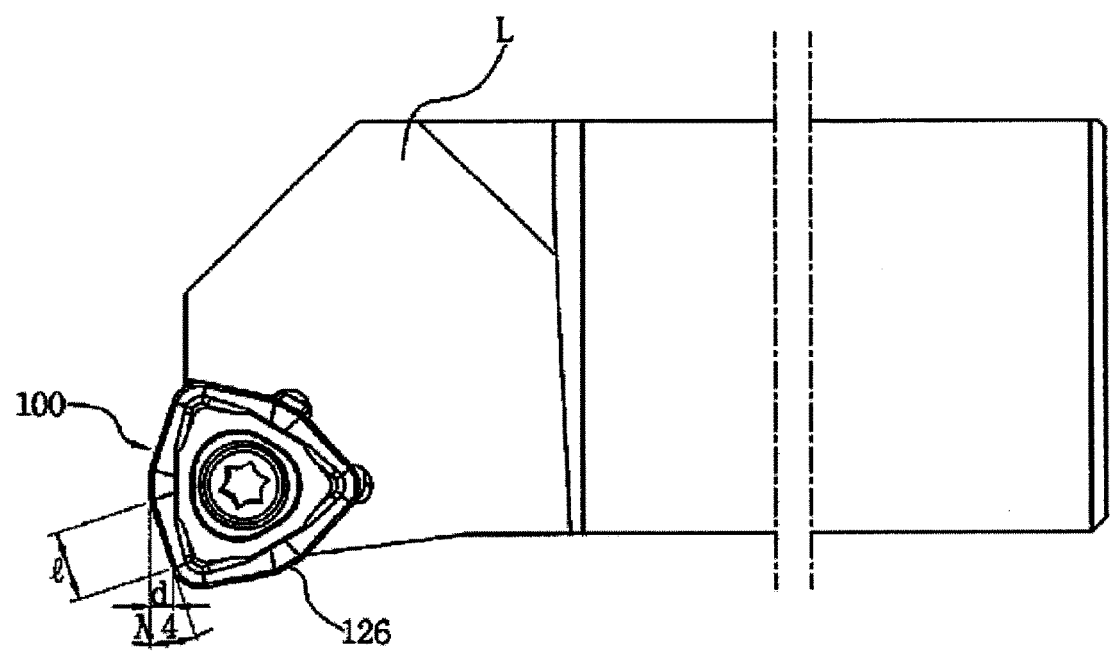
FIG. 8 is a view showing the mounting of the cutting insert of FIG. 1 to a turning cutter body.

FIG. 7 is a view showing the mounting of the cutting insert of FIG. 1 to the milling cutter body. FIG. 8 is a view showing the mounting of the cutting insert of FIG. 1 to a turning cutter body.

Referring to FIGS. 7 and 8, in the present invention, when the cutting insert 100 is mounted to the milling cutter body M or the turning cutter body L, to ensure clearance angles of the side surfaces 114, which are adjacent to the corresponding minor cutting edge 126, the cutting insert 100 is coupled to the milling cutter body M or the turning cutter body L such that the axial inclination angle λ1 thereof is within a range from −5° to −10°. Thus, each of the side surfaces 114, which are adjacent to the corresponding minor cutting edge 126, has a clearance angle λ2 ranging from −5° to −10°. Furthermore, the axial inclination angle λ3 of the corresponding major cutting edge 124 ranges from +5° to +10°, and the immersion angle λ4 of the major cutting edge 124 ranges from 15° to 30°.

In addition, the cutting insert 100 is mounted to the milling cutter body M or the turning cutter body L, such that the length I of the major cutting edge 124, which is involved with the cutting, is twice as much or more than the depth d, to which the major cutting edge 124 is immersed in a workpiece when cutting.

Those skilled in the art will appreciate that the present invention is not limited to the preferred embodiment and the attached drawings, and that various modifications, additions and substitutions are possible, without departing from the scope and spirit of the invention.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A cutting insert for high-efficiency cutting, including an upper surface, a lower surface, side surfaces for connecting the upper surface and the lower surface to each other, and corner side surfaces for connecting the side surfaces to each other in rounded shapes, with a circular opening formed through central portions of the upper and lower surfaces, the cutting insert comprising:
   cutting edges formed by respective junctions between one of the upper and lower surfaces and the side surfaces and between one of the upper and lower surfaces and the corner side surfaces consisting of three corner side surfaces,
   the cutting edges comprising:
   corner side cutting edges consisting of three corner side cutting edges corresponding to the three corner side surfaces respectively,
   three major cutting edge pairs, each pair including major cutting edges extending from opposite ends of the corner side cutting edges towards neighboring corner side cutting edges,
   three minor cutting edges connecting the major cutting edges, wherein the major cutting edges are longer than the minor cutting edges, and
   six boundary cutting edges, each boundary cutting edge positioned between one of the three minor cutting edges and a respective one of the three major cutting edges at the junction between a boundary edge and one of the upper and lower surfaces, the boundary edge forming a junction between the upper and lower surfaces.

2. The cutting insert for high-efficiency cutting according to claim 1, wherein the cutting edges are formed by respective junctions between the upper and lower surfaces and the side surfaces and between the upper and lower surfaces and the corner side surfaces, the cutting edges comprising:
   six corner cutting edges;
   twelve major cutting edges extending from opposite ends of the corner cutting edges towards the neighboring corner cutting edges; and
   six minor cutting edges connected between the major cutting edges.

3. The cutting insert for high-efficiency cutting according to claim 2, wherein, when the corner cutting edges and the minor cutting edges are seen in a front view, each of the major cutting edges, which is formed in the upper surface, and the corresponding major cutting edge, which is formed in the lower surface, are oriented relative to each other at an angle (γ) ranging from about 0° to 20°.

4. The cutting insert for high-efficiency cutting according to claim 2, wherein, when the corner cutting edges and the minor cutting edges are seen in a front view, the adjacent major cutting edges, which extend from respective opposite ends of each of the corner cutting edges or each of the minor cutting edges, have an included angle δ ranging from about 160° to 180°.

5. The cutting insert for high-efficiency cutting according to claim 1, wherein the cutting edges, which comprise the corner side cutting edges, the major cutting edges and the minor cutting edges, further comprise the boundary edge having a predetermined curvature along the length of the junction between the upper and lower surfaces.

6. The cutting insert for high-efficiency cutting according to claim 5, wherein the boundary cutting edge has a curvature radius ranging from about 0.3 mm to 3.0 mm.

7. The cutting insert for high-efficiency cutting according to claim 5, wherein the corner side cutting edges, the major cutting edges, the boundary cutting edges and the minor cutting edges are flush with each other.

8. The cutting insert for high-efficiency cutting according to claim 5, wherein, when seen in a plan view or a front view of the cutting insert, the boundary cutting edges and the corresponding minor cutting edge have a predetermined convex curvature.

9. The cutting insert for high-efficiency cutting according to claim 8, wherein a radius of the convex curvature ranges from about 150 mm to 300 mm.

10. The cutting insert for high-efficiency cutting according to claim 5, wherein the minor cutting edges are formed higher or lower than the corner side cutting edges, and each of the major cutting edges extends from the corresponding corner side cutting edge towards the corresponding minor cutting edge at an upward or downward incline.

11. The cutting insert for high-efficiency cutting according to claim 10, wherein, when seen in a plan view of the cutting insert, each of the major cutting edges and the minor cutting edges is defined by a linear line.

12. The cutting insert for high-efficiency cutting according to claim 10, wherein, when seen in a plan view or a front view of the cutting insert, each of the minor cutting edges is defined by a convex curved line.

13. The cutting insert for high-efficiency cutting according to claim 1, wherein each of the corner side cutting edges has a curvature radius ranging from about 0.5 mm to 3.0 mm.

14. The cutting insert for high-efficiency cutting according to claim 1, wherein a corner land surface, a major cutting edge land surface and a minor cutting, edge land surface respectively extend from each of the corner cutting edges, each of the major cutting edges and each of the minor cutting edges towards the upper surface or the lower surface at predetermined inclined angles, a corner chip breaker, a major cutting edge chip breaker and a minor cutting edge chip breaker are respectively provided between the upper surface or the lower surface and the corner land surface, the major cutting edge land surface and the minor cutting edge land surface, and each of the corner chip breaker, the major cutting edge chip breaker and the minor cutting edge chip, breaker has a chip breaker angle θ that is less than about 90° with respect to the corresponding corner side surface or the corresponding side surface.

15. The cutting insert for high-efficiency cutting according to claim 1, wherein the major cutting edges extend from respective opposite ends of each of the corner cutting edges towards the corresponding neighbor corner cutting edges at an included angle (α) ranging from about 80° to 120°.

16. The cutting insert for high-efficiency cutting according to claim 1, wherein an angle (β) between each of the minor cutting edges and the adjacent major cutting edge is less than about 30°.

17. The cutting insert for high-efficiency cutting according to claim 1, wherein the minor cutting edges are arranged to have a 120° rotationally symmetrical structure based on the circular opening.

18. The cutting insert for high-efficiency cutting according to claim 1, wherein the length of the junction between the upper and lower surfaces is greater at the boundary cutting edges than the length of the junction between the upper and lower surfaces at the corner side cutting edges.

* * * * *